United States Patent [19]

Deardorff et al.

[11] 3,728,402

[45] Apr. 17, 1973

[54] DIACYL PEROXIDES

[75] Inventors: Donald L. Deardorff, Riverside; Edwin T. Chesler, East Providence; Joseph L. Fath, Barrington, all of R.I.

[73] Assignee: Teknor Apex Company, Pawtucket, R.I.

[22] Filed: May 15, 1968

[21] Appl. No.: 729,451

Related U.S. Application Data

[63] Continuation-in-part of Ser. No. 662,578, Aug. 23, 1967, abandoned.

[52] U.S. Cl. ..............260/610 D, 260/75 T, 260/94.9

[51] Int. Cl. ..............C07c 73/02

[58] Field of Search ..............260/610 D, 610 A

[56] References Cited

UNITED STATES PATENTS 2,865,904 12/1958 Seed et al. ..............260/94.9

FOREIGN PATENTS OR APPLICATIONS 679,516 4/1965 Belgium ..............260/610 D 1,086,405 10/1967 Great Britain ..............260/610 D

*Primary Examiner*—Bernard Helfin
*Assistant Examiner*—W. B. Lone
*Attorney*—Hugo E. Weisberger

[57] ABSTRACT

3-Alkoxy acyl peroxides having the formula:

$$R-O-CH_2-\underset{X}{\underset{|}{C}}H-\overset{O}{\overset{\|}{C}}-O-O-\overset{O}{\overset{\|}{C}}-\underset{X}{\underset{|}{C}}H-CH_2-O-R$$

in which R is alkyl containing from one to 14 carbon atoms, and X is hydrogen or methyl are new compounds which resemble common diacyl peroxides in manner of decomposition, but exhibit important differences in chemical and physical properties. The new peroxides are liquids at ambient temperatures and possess a higher degree of thermal stability than the commonly used aliphatic acyl peroxides of similar structure and molecular weight. The new compounds, and especially the 3-alkoxyisobutyryl peroxides, are suitable for use as initiators for the polymerization or copolymerization of ethylenic monomers and for the cross-linking of unsaturated polyesters.

3 Claims, No Drawings

DIACYL PEROXIDES

CROSS-REFERENCE TO RELATED APPLICATION

This application is a continuation-in-part of application Ser. No. 662,578, filed Aug. 23, 1967 now abandoned.

BACKGROUND OF THE INVENTION

Diacyl peroxides are extensively employed as catalysts and initiators for the polymerization and copolymerization of ethylenic monomers, particularly for vinyl polymerizations. Examples of such known diacyl peroxides include benzoyl peroxide, lauroyl peroxide, decanoyl peroxide, caprylyl peroxide, isobutyryl peroxide, and acetyl peroxide.

Most of the commonly used diacyl peroxides are solids at ordinary temperatures, and are supplied commercially in granular or powder form. The diacyl peroxides are generally thermally unstable, and as such are hazardous materials, requiring special precautions in handling and storage.

One of the most widely used peroxides is lauroyl peroxide, which is considered one of the less hazardous diacyl peroxides since it is insensitive to shock and heating it in bulk does not result in deflagration. Benzoyl peroxide, on the other hand, is both shock-sensitive and subject to deflagration in bulk decomposition.

The known liquid organic peroxides are generally unstable and tend to decompose upon standing at room temperatures, sometimes with explosive violence, and this property has greatly restricted their use. Efforts have been made to stabilize liquid organic peroxides by the use of additives, such as iodine, and a procedure of this kind is described in U. S. Pat. No. 2,415,971.

However, the presence of such additives may exert unfavorable effects upon the polymerization process when the peroxide is employed as a catalyst or initiator.

Accordingly, there has existed a need for a liquid organic peroxide compound which would be suitable as a catalyst and initiator for polymerizations, and which would possess a free radical generation rate similar to that of the conventional catalysts, while exhibiting good thermal stability at ambient temperatures.

SUMMARY OF THE INVENTION

In accordance with the present invention, there is provided a novel class of diacyl peroxides having the general formula:

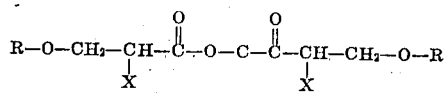

in which R is alkyl containing from one to 14 carbon atoms and X is H or $CH_3$. The alkyl group may be either straight chain or branched structure, but the compounds within contemplation of the invention are those in which both R substituents are the same, i.e. symmetrical dialkoxydiacyl peroxides. Preferably the alkyl groups contain from four to 10 carbon atoms.

Examples of suitable alkyl substituents include butyl, isobutyl, pentyl, hexyl, heptyl, octyl, 2-ethylhexyl, decyl, dodecyl, tridecyl, and tetradecyl.

The foregoing general formula includes within its structure two distinct classes of 3-alkoxy diacyl peroxides, namely (1) 3-alkoxypropionyl peroxides, and (2) 3-alkoxyisobutyryl peroxides. While these two classes of diacyl peroxides according to the present invention possess certain similarities in structure and fundamental physical properties, they differ markedly in other respects, such as, for example, their thermal decomposition rates, and in their performance as polymerization initiators, the isobutyryl peroxides being distinctly superior in this regard. Accordingly, the propionyl peroxides and the isobutyryl peroxides comprise classes each having their own special characteristics, and are therefore not to be regarded as equivalents.

The novel diacyl peroxides of the invention are liquids which are more stable at room temperature than known peroxides of equivalent free radical generation characteristics. They are characterized structurally by the presence of an ether oxygen in the β-position to the acyl carbon atom. The presence of the ether linkage is fundamental to the chemical and physical properties of the peroxides. Thus, for example, the compound 3-(2-ethylhexoxy)-propionyl peroxide of the invention has a molecular weight of 402, which is very close to that of lauroyl peroxide, which is 398, but it is a liquid of low viscosity and very low freezing point, which does not solidify at −65°C. All the 3-alkoxy diacyl peroxides of the present invention are mobile liquids at normal temperatures, and even the lower molecular weight derivatives solidify only at very low temperatures. Thus, for example, 3-butoxy-propionyl peroxide, which has a molecular weight of 290, solidifies below −10°C., and the compound β-(isobutoxy)-isobutyryl peroxide solidifies at −40°C.

For a given compound to be useful as an initiator for polymerization reactions, there is a relatively narrow and characteristic range of temperature within which the compound must exhibit useful activity. Thus, although a very wide range of thermally unstable compounds are known and available as initiators for radical-induced reactions, only relatively few of these compounds are suitable for any particular reaction since these reactions have certain prerequisites in regard to temperature and solubility. Moreover, in some instances, reactions are limited to a particular temperature range because of the limited availability of initiators with suitable activity.

One such temperature range in which reaction flexibility is limited owing to a lack of suitable initiators is the range from about 25°C. to about 60°C., and more particularly from about 40° to 55°C. This range is of great importance in the plastics industry, since a large proportion of ethylenic polymerization is desirably or necessarily performed within it. Thus, for example, a major proportion of polyvinyl chloride is produced in the range 50° to 55°C. Heretofore, most of this has been produced with the aid of lauroyl peroxide, an initiator with very low reactivity at these temperatures. As a result of this low reactivity, large amounts of lauroyl peroxide are needed to retain reasonable reaction times. This leads to undesirable consequences, such as residues of initiator in the product, low productivity from long reactor cycles, and uneven and undesirable reaction exotherm profiles. Even with these drawbacks, lauroyl peroxide has remained the most commonly used initiator, partly owing to its relatively low hazard potential, and partly because of the limited availability of practical and versatile compounds with equal or better reactivity over the desired temperature range. A comparatively recently developed group of initiators is that of the dialkyl peroxydicarbonates, particularly isopropyl peroxydicarbonate. The latter compound exhibits much greater activity in the temperature range of 40° to 55°C. than does lauroyl peroxide, but in addition to poor solubility characteristics in many systems, it possesses hazardous decomposition characteristics unless maintained at very low temperatures and/or in dilute hydrocarbon solutions. Also at the lower limit of temperature of about 40°C., this compound shows rapidly diminished activity. For practical purposes, the polymerization profiles of the peroxydicarbonates resemble fairly closely those of lauroyl peroxide.

Among the most desirable properties of an initiator are: (a) increased reactivity at critical and useful temperature ranges so that substantial conversion of monomer occurs in the early stages of the polymerization, resulting in a more evenly distributed exotherm throughout the reaction; (b) virtually complete decomposition of the initiator during the reaction cycle; and (c) good solubility in organic solvents.

The foregoing requirements are entirely satisfied by the novel 3-alkoxy-isobutyryl peroxides of the present invention. These compounds are effective as initiators in ethylenic polymerization reactions in the range of 40° to 55°C. to an extent which is both surprising and unexpected. Thus, for example, the compound 3-(2-ethylhexoxy)-isobutyryl peroxide, which is illustrative of the class of alkoxy-isobutyryl peroxides of the present invention, is especially effective as an initiator at the critical temperature of 51°C. which is important in vinyl chloride polymerization. Lauroyl peroxide initiates vinyl chloride polymerization very slowly and exhibits an accelerating effect as the reaction proceeds. For instance, in a typical lauroyl peroxide initiated system at 123°F. (51°C.), about 73 percent of the polymer is made in the first 88 percent of the reaction cycle. The remaining 27 percent of the polyvinyl chloride is formed in the last 12 percent of the reaction cycle. In contrast thereto, the initiator 3-(2-ethylhexoxy)-isobutyryl peroxide is capable of producing about 60 percent of the polymer in the first 37 percent of the polymerization cycle, and the remaining 40 percent in the last 63 percent of the reaction period.

The most desirable way to polymerize vinyl chloride is to have the reaction take place at a uniform rate over a fairly short cycle time. Using lauroyl peroxide, the total cycle is 16 hours, with a considerable proportion of the polymerization squeezed into the last few hours. The 3-(2-ethylhexoxy)-isobutyryl peroxide initiator accomplishes the reaction in only 11 hours, and with a much more desirable distribution of the polymerization toward the earlier portions of the cycle.

Although there is a similarity in structure between the propionyl peroxides and the isobutyryl peroxides of the present invention, there is nevertheless a very great difference in their behavior and effectiveness as initiators for polymerization, as well as in terms of relative kinetic stability.

Decomposition rate studies of the thermal stability of the 3-alkoxypropionyl peroxides of the invention in comparison with such known peroxides as lauroyl peroxide and benzoyl peroxide indicate that the compounds of the invention are intermediate in rate of thermal decomposition between lauroyl and benzoyl peroxide. Moreover, the length or structure of the alkoxy group has little or no influence on the rate of decomposition. The alkoxy-propionyl peroxides exhibit half-lives longer than, but fairly comparable to lauroyl peroxide. Hence their behavior as initiators is also fairly comparable.

The half-lives exhibited by the 3-(alkoxy)-isobutyryl peroxides are, however, very different from those of either the alkoxypropionyl peroxide or lauroyl peroxide, being far shorter. The half-life of an initiator, expressed in hours, and typically determined on a 0.2 molar solution of a given compound in benzene, at a given temperature, such as 60°C., is an excellent indicator of the effectiveness of compound as an initiator for ethylenic polymerization, such as vinyl chloride polymerization.

As mentioned previously, the 3-alkoxy-isobutyryl peroxides of the present invention are superior initiators of ethylenic polymerization. Thus, the half-life of the 3-alkoxyisobutyryl peroxide compound 3-(2-ethylhexoxy)-isobutyryl peroxide is about 0.3 hour at 60°C., whereas the half-life of the corresponding 3-alkoxy-propionyl peroxide, namely 3-(2-ethyl-hexoxy)-propionyl peroxide at the same temperature is about 42 hours. The ratio of half-lives of the propionyl to the isobutyryl peroxide is 42/0.3 indicating that the isobutyryl peroxide is about 130 times faster in its decomposition rate, and also indicating that the isobutyryl peroxides as a group will initiate many times faster than the propionyl peroxides.

Studies on polymerization of vinyl chloride have indicated that the 3-alkoxy-isobutyryl peroxides of the present invention not only produce much faster polymerization rates than the corresponding 3-alkoxy-propionyl peroxides, but very much faster than lauroyl peroxide, as a matter of fact, whereas it is not possible to produce polyvinyl chloride resins of very high molecular weights with lauroyl peroxide or the 3-alkoxy propionyl peroxides because of their relative inactivities at the low temperatures required, it is quite readily possible to produce such results using the 3-alkoxy isobutyryl peroxides.

Thus, as is shown below, polymerizations carried out in the 25° – 40°C. temperature range are impractical to carry out with the former initiators, whereas the 3-alkoxy isobutyryl peroxides will give high degrees of conversion within commercially feasible reaction times.

As is demonstrated in the examples below, it is possible to obtain polyvinyl chloride polymers having specific viscosities of 0.8 and even as high as 1.0, whereas the conventional initiators do not produce polymers in excess of ca. 0.55 under practicable production conditions.

These great differences between the 3-alkoxy-isobutyryl peroxides as a class, on the one hand, and the 3-alkoxy-propionyl peroxides or lauroyl peroxide, in respect to kinetic activity levels, are believed to be due to a combination of the $\alpha$-branched chain structure and the presence of a $\beta$-oxygen atom in the alkanoyl groups. Chain length also plays a part, but only to a limited extent.

In conventional diacyl peroxides, an active oxygen content in excess of 5.0 percent is generally regarded as resulting in a shock-sensitive, hazardous material. However, in the case of the 3-alkoxy isobutyryl peroxides and the 3-alkoxy-propionyl peroxides of the present invention, no indication of shock sensitivity or tendency toward deflagration is exhibited even in the butoxy derivatives which have a high active oxygen content of as much as 5.5 weight percent.

Moreover, the peroxides of the present invention exhibit a lack of sensitivity to heating in bulk, while offering the convenience of being liquids. This, together with their ability to maintain free radical generation rates similar to or greatly in excess of the commonly used diacyl peroxides, provides a high degree of usefulness both as catalysts or initiators for polymerization and cross-linking reactions.

Typical examples of the 3-alkoxy-isobutyryl peroxides of the invention include:

3-(2-ethylhexoxy)-isobutyryl peroxide
2-(isobutoxy)-isobutyryl peroxide

Typical examples of 3-alkoxy-propionyl peroxides of the invention include:

3-(2-ethylhexoxy)-propionyl peroxide
3-(isohexoxy)-propionyl peroxide
3-(n-butoxy)-propionyl peroxide
3-(isobutoxy)-propionyl peroxide The physical properties of six of these compounds, in comparison with those of lauroyl and benzoyl peroxides are set forth in the following table. The active oxygen content of the peroxides was determined by liberation of iodine and titration with standard thiosulfate solution:

TABLE 1

Properties of 3-Alkoxy-propionyl and 3-Alkoxy-isobutyryl Peroxides

| Peroxide | Active Theory | Oxygen Found | Freezing Pt.°C. | $D^{25}$ | Viscosity cs.25°C. |
|---|---|---|---|---|---|
| (2-ethylhexoxy) propionyl | 3.98 | 3.51 | −65 | 0.954 | 16.9 |
| (isohexoxy) propionyl | 4.63 | 3.52 | −65 | 0.957 | 19.5 |
| (n-butoxy) propionyl | 5.52 | 5.18 | −12 | — | — |
| (iso-butoxy) propionyl | 5.52 | 5.25 | −13 | 0.993 | 9.28 |
| 3-(2-ethylhexoxy) isobutyryl | 3,78 | 3.12 | −40 | 0.920 | 16.4 |
| 3-(isobutoxy) isobutyryl peroxide | 5.03 | 4.45 | −40 | 0.958 | — |
| lauroyl[1] | 4.02 | 3.83 | +48 | — | solid |
| benzoyl[1] | 6.61 | 6.5 | +106 | — | solid |

[1] Commercial samples used as standards of comparison

Kinetic studies of thermal decomposition of the above six peroxides of the invention, in comparison with lauroyl and benzoyl peroxides, were conducted in dilute benzene solution. Solutions of approximately 0.1 N peroxide in reagent grade benzene were prepared and 10 ml. portions were placed in 18 mm × 125 mm test tubes. The tubes were purged with nitrogen, stoppered and placed in a constant temperature bath. Samples were removed at 30 minute intervals and analyzed for residual active oxygen content by a standard iodometric method. The results are summarized in the following table:

TABLE 2

3-Alkoxypropionyl and 3-Alkoxyisobutyryl Peroxides Decomposition Rate Studies[1]

| Peroxide | Temp. °C. | Rate Constant K $Hr^{-1}$ | Half-Life Hours |
|---|---|---|---|
| 2-ethylhexoxy propionyl | 60 | 0.0162 | 42 |
| | 70 | 0.0794 | 8.75 |
| | 80 | 0.265 | 2.62 |
| iso-hexoxy propionyl | 60 | 0.01765 | 39.3 |
| | 70 | 0.0872 | 7.9 |
| | 80 | 0.285 | 2.4 |
| n-butoxy propionyl | 60 | 0.0174 | 39.8 |
| | 70 | 0.0796 | 8.7 |
| | 80 | 0.262 | 2.64 |
| iso-butoxy propionyl | 80 | 0.294 | 2.35 |
| 3-(2-ethylhexoxy)isobutyryl | 25 | 0.0216 | 32.0 |
| | 30 | 0.041 | 16.9 |
| | 40 | 0.180 | 3.85 |
| 3-(isobutoxy)isobutyryl | 25 | 0.027 | 25.6 |
| | 40 | 0.201 | 3.5 |
| lauroyl | 60 | 0.0453 | 15.3 |
| | 70 | 0.17 | 4.0 |
| | 80 | — | 1.0 |
| benzoyl | 60 | 0.0145 | 47.8 |
| | 70 | 0.036 | 19. |
| | 80 | 0.165 | 4.2 |

[1] Disappearance of active oxygen (iodometric) 0.1 N solutions in benzene.

The novel 3-alkoxy-isobutyryl and 3-alkoxy-propionyl peroxides of the invention may be prepared by well known methods of synthesis applicable to the preparation of aliphatic diacyl peroxides. Such methods are described in A. G. Davies "Organic Peroxides", Butterworths, London, 1961.

Thus, a commonly practiced method for the preparation of diacyl peroxides comprises reacting an acyl chloride, such as lauroyl, decanoyl, or caprylyl chloride with dilute aqueous hydrogen peroxide in the presence of a strong inorganic base. In a similar manner, the peroxides of the present invention may be prepared by contacting the appropriate alkoxyisobutyryl chloride or alkoxypropionyl chloride with dilute hydrogen peroxide in the presence of an alkali metal hydroxide such as sodium, potassium or lithium hydroxide. The hydrogen peroxide may, for example, have a concentration ranging from about 10 percent to about 70 percent by weight and the ratio of hydrogen peroxide may, for example, range between about 0.5 and 1.0 moles per mole of acyl chloride.

The alkali metal hydroxide may be supplied to the reaction, for example, in the form of an aqueous solution having a concentration between about 10 percent and 50 percent by weight. The ratio of alkali metal hydroxide may vary between about 1 and 2 moles per mole of 3-alkoxy-isobutyryl chloride or 3-alkoxy-propionyl chloride.

The reaction of the acyl chloride with alkali and hydrogen peroxide is performed, for example, in the range of about −5° to 20°C., preferably about −2° to 6°C. Total reaction time will usually lie between about 0.5 and 3 hours.

The 3-alkoxy-isobutyryl chloride or the 3-alkoxy propionyl chlorides may be prepared, for example, from the corresponding 3-alkoxy-isobutyric acid or 3-alkoxypropionic acid by acylation with phosphorus trichloride in accordance with known methods.

In accordance with a further aspect of the invention, it has been found that the 3-alkoxy-isobutyryl peroxides can be used conjointly with a second initiator so as to achieve a uniform rate of the polymerization reaction over a fairly short cycle time. Thus, for example, a dialkyl peroxydicarbonate may be used in combination with a 3-alkoxy-isobutyryl peroxide to produce a polymerization rate which is neither slower in the beginning, nor which accelerates greatly toward the end of the conversion. This enables an essentially rapid polymerization reaction, such as that of vinyl chloride, to be maintained at a level which can be controlled by the conventional cooling equipment used, and which remains at essentially the same level throughout the polymerization. In the case of vinyl chloride polymerization, which is advantageously carried out at a temperature between about 125° and 135°F., a suitable initiator mixture, in accordance with the present invention, is from about 2 to 6 parts by weight of 3-alkoxy-isobutyryl peroxide per 1 part of dialkyl peroxydicarbonate, preferably about 4:1. When using 3-(2-ethylhexoxy)-isobutyryl peroxide, a suitable peroxydicarbonate for admixture therewith is di(sec.-butyl)-peroxydicarbonate, the ratio of the isobutyryl compound to the peroxydicarbonate being about 4 to 1 parts by weight. This mixture provides a short reaction time and almost uniform conversion in the polymerization of vinyl chloride, there being a variation of only about 5°F. in the jacket temperature from beginning to the end of the reaction and consequently, a very constant difference between the internal temperature and the jacket temperature of the reactor. It will be understood that varying the ratio of peroxide to dialkyl peroxydicarbonate will permit changes in the conversion rate and the exotherm profile of the reaction. In the dialkyl peroxydicarbonate, the alkyl group may contain from one to six carbon atoms, such as for example, methyl, ethyl, propyl, butyl, isobutyl, amyl, hexyl, cyclohexyl, butyl cyclohexyl, 2-ethyl hexyl, lauryl, etc.

The 3-alkoxy-isobutyryl peroxides of the invention, and the 3-alkoxypropionyl peroxides as well, provide effective catalysts and initiators in the polymerization or copolymerization of ethylenic monomers, and especially for the preparation of such polymers of vinyl halides or vinylidene halides. These include vinyl chloride polymers, and copolymers of vinyl halides such as vinyl chloride, with at least one other polymerizable monomer, such as vinyl acetate, vinyl propionate, vinyl butyrate, vinylidene chloride, methyl methacrylate, methyl acrylate, propylene, vinyl cetyl ether and the like. The peroxides may also be used as catalysts in the polymerization of olefins, such as ethylene, propylene and butylene, or in the copolymerization of such olefins with other mono-olefins, such as halogenated ethylenes, vinyl ethers, vinyl chloride, vinyl acetate, vinyl propionate, styrene, and acrylates and methacrylates. They may also be used as initiators in the cross-linking of unsaturated polyesters, such as those made from propylene glycol, maleic anhydride, phthalic anhydride, and styrene.

In such polymerizations, the amounts of peroxides employed will depend upon the reactants, but may lie in the range of about 0.01 percent to 0.5 percent and upward.

DESCRIPTION OF THE PREFERRED EMBODIMENTS

The following examples serve to illustrate the practice of the invention, but are not to be regarded as limiting.

EXAMPLE 1

Preparation of 3-(Isohexoxy)-Propionyl Peroxide

This compound was prepared by addition of 58 g. 3-(1-hexoxy) propionyl chloride to a stirred and cooled solution consisting of 62.5 g. of 25 percent sodium hydroxide, 14.6 g. of 50 percent hydrogen peroxide and 262 g. water. Temperature was maintained at 2° to 6°C. during the addition, which required 50 minutes, and for an additional 60 minutes. The oil product was separated and washed three times with 300 ml. portions of water to give 39 g. of a colorless oil with 3.53 percent active oxygen.

EXAMPLE 2

Preparation of 3-(2-Ethylhexoxy)-Propionyl Peroxides

This compound was prepared by adding 66 g. of 3-(2-ethylhexoxy) propionyl chloride to a stirred and cooled solution containing 62.5 g. of 25 percent sodium hydroxide, 14.6 g. of 50 percent hydrogen peroxide and 262 g. addition of water. The reaction kettle was maintained at −3°C. to 1.5°C. during the time of addition which required 1.5 hours. Sitrring was continued for 45 minutes during which time the temperature was allowed to rise to 15°C. The product, separated as an oil, was removed and washed two times with 400 ml. portions of distilled water to give 37 g. of a slightly viscous and colorless oil with 3.49 percent active oxygen (Theory = 3.98 percent active oxygen).

EXAMPLE 3

Polymerization of Vinyl Chloride

The effectiveness of the peroxide of Example 2 as an initiator in comparison with lauroyl peroxide and benzoyl peroxide, in the polymerization of vinyl chloride was tested by preparing three formulations having the composition:

| | Parts by Weight |
|---|---|
| Vinyl chloride | 100 |
| Initiator | 0.2 |
| Methylcellulose | 0.6 |
| Water | 300 |

The polymerization was carried out at a temperature of 142°F. for a period of 18 hours.

The properties of the resulting polyvinyl chloride are summarized in the following table:

TABLE 3

| Initiator | Lauroyl Peroxide | 3-(2-Ethylhexoxy) Propionyl Peroxide | Benzoyl Peroxide |
|---|---|---|---|
| Yield of Polymer, Parts | 9.25 | 93.2 | 93.6 |
| Specific Viscosity | 0.318 | 0.321 | 0.325 |
| Heat Stability, Minutes at 350°F. | | | |
| To first yellow | 30 | 30 | 15 |
| To black | 60 | 70 | 60 |

In comparison with lauroyl peroxide, the peroxide of Example 2 resulted in increased and greater heat stability, while in comparison with benzoyl peroxide, it showed less tendency toward early decomposition.

EXAMPLE 4

3-(2-Ethylhexoxy) Isobutyryl Peroxide

This compound was prepared by adding 105 g. of 3-(2-ethylhexoxy) isobutyryl chloride to a stirred and cooled solution containing 90 g. of 25 percent sodium hydroxide, 20.5 g. of 50 percent hydrogen peroxide and 35.0 g. of water. The reaction kettle was maintained at −3° to 5°C. during the time of addition which required 30 minutes. Stirring was continued for an additional 2 hours during which time the temperature was allowed to rise to 10°C. The oil product was separated and washed three times with 100 ml. portions of distilled water to get 86 g. of oil containing 3.02 percent active oxygen by iodometric determination. The physical constants were:

| | |
|---|---|
| Specific Gravity | $^{25}/15.6°C.=0.920$ |
| Refractive Index | $^{25}/D=1.442$ |
| Viscosity, cs, 25°C. | =16.4 |
| Specific Viscosity ηsp | =0.84 |

EXAMPLE 5

The peroxide of Example 4 was compared with 3-(2-ethylhexoxy) propionyl peroxide in the polymerization of vinyl chloride in formulations of the following composition:

| | Parts by Weight |
|---|---|
| Vinyl Chloride | 100 |
| Initiator | 0.1 |
| Methylcellulose | 0.6 |
| Water | 200 |

The polymerization was carried out at a low temperature of 86°F. for a period of 18 hours. Properties of the resulting polyvinyl chloride are summarized in the following table:

TABLE 4

| Initiator | Compound of Example 4 | 3-(2-Ethylhexoxy) Propionyl Peroxide |
|---|---|---|
| Yield of polymer, parts | 86.7 | nil |
| Heat Stability, Minutes at 350°F. To black | 195 | — |

This indicates the total inactivity of the propionyl compound of this invention.

EXAMPLE 6

Polymerization of Vinyl Chloride

In a separate experiment the 3-(2-ethylhexoxy)-isobutyryl peroxide of Example 4 was compared with lauroyl peroxide in formulations of the following composition:

| | Parts by weight |
|---|---|
| Vinyl Chloride | 100 |
| Initiator | 0.1 |
| Methylcellulose | 0.6 |
| Water | 200 |

The polymerization was carried out at a temperature of 104°F. for a period of 18 hours. Yields and properties of resulting polyvinyl chloride are as follows:

| Initiator | Example 4 | Lauroyl Peroxide |
|---|---|---|
| Yield of polymer, parts | 89.7 | 25 |
| Specific viscosity ηsp | 0.6 | — |
| Heat stability, minutes at 350°F. To black | 250 | 180 |

EXAMPLE 7

Preparation of 3-(isobutoxy) isobutyryl peroxide

The compound was prepared by addition of 380 g. of 3-(isobutoxy) isobutyryl chloride to a stirred and cooled solution containing 384 g. of 25 percent sodium hydroxide, 82 g. of 50 percent hydrogen peroxide and 800 g. of water. Temperature was maintained at 0°C. during the addition, which required 15 minutes and for 15 minutes beyond. At that time the oil product was separated and washed three times with 100 ml. portions of distilled water to give 255 g. of oil product containing 4.45 percent active oxygen by iodometric determination. The oil product had a refractive index of 25°C. of 1.4292 and specific gravity 25/15.6 of 0.96.

EXAMPLE 8

The peroxide of Example 7 was evaluated in the polymerization of vinyl chloride in the following formulation:

| | Parts by Weight |
|---|---|
| Vinyl choride | 100 |
| Initiator | 0.1 |
| Methylcellulose | 0.6 |
| Water | 200 |

The polymerization was conducted at a temperature of 86°F. for a period of 18 hours. Comparison of polymer yield with the compound of Example 4 and with 3-isobutoxy propionyl peroxide is shown in the following table:

TABLE 5

| Initiator | 3-Isobutoxy Propionyl Peroxide | Ex. 4 | Ex. 7 |
|---|---|---|---|
| Yield of Polymer, parts | nil | 88.3 | 88.9 |

EXAMPLE 9

Cross Linking of Unsaturated Polyester Resins

A mixture was prepared of the following ingredients in the molar ratios shown:

| | |
|---|---|
| Maleic anhydride | 1.0 mole |
| Phthalic anhydride | 1.0 mole |
| Propylene glycol | 2.2 moles |

To 7 parts by weight of the foregoing mixture, which has an acid value of 45 – 50, there were added 3 parts of monomeric styrene. Immediately prior to curing there was added 0.1 percent of 3-(2-ethylhexoxy) propionyl peroxide and the mixture was cured by heating to form a cross linked polyester resin. Peroxides of the invention were compared with commercial diacyl peroxides in polymerization of the resulting cross-linkable formulation in the following manner. Mixtures comprising 100 parts of the cross-linkable resin solution and 0.008 mol equivalents peroxide were placed in a constant temperature both at 90°C. Time and temperature data were recorded at the point where gelatin was first noted (designated the kick off temperature) and at the peak exotherm.

TABLE 6

| Peroxide | Kick Off Time Min. | Kick Off Temp. °C. | Peak Exotherm Time Min. | Peak Exotherm Temp. °C. |
|---|---|---|---|---|
| Example 2 | 9.0 | 95 | 10.9 | 175 |
| Example 4 | 2.3 | 72 | 4.0 | 135 |

| | | | | |
|---|---|---|---|---|
| Lauroyl Peroxide | 4.25 | 91 | 6.3 | 176 |
| Benzoyl Peroxide | 5.3 | 96 | 7.0 | 170 |

EXAMPLE 10

Polymerization of Vinyl Chloride With a Mixture of 3-(2-ethylhexoxy)-isobutyryl Peroxide and Di(sec.-butyl)-Peroxydicarbonate A jacketed pressure reactor capable of being heated or cooled by automatically controlled water flow was charged with 100 parts by weight of vinyl chloride monomer, 200 parts deionized water, 0.1 parts Methocel (methyl cellulose), and a mixture of 0.05 parts of 3-(2-ethylhexoxy)-isobutyryl peroxide and 0.0125 parts of di(sec.-butyl)-peroxydicarbonate. The internal temperature of the reactor was set to be controlled at 124°F. The difference between the jacket temperature and the internal reactor temperature is designated ΔT in the table below and is an effective measure of the monomer conversion rate at any instant. The more nearly ΔT is constant from the beginning to the end of the polymerization, the more nearly is the conversion rate constant throughout the processs. Differences in initial and final percent ΔT and in maximum and minimum ΔT are shown as absolute numbers, without regard to sign:

TABLE 7

Initiator: 0.05/0.0125 CBP/BPD

| Time at 124°F. Hrs. | ΔT °F. | % ΔT max. |
|---|---|---|
| 0 | 34 | 68 |
| 0.75 | 34 | 68 |
| 1.25 | 39 | 78 |
| 2.25 | 39 | 78 |
| 3.25 | 39 | 78 |
| 4.25 | 37 | 72 |
| 5.25 | 34 | 68 |
| 6.25 | 33 | 66 |
| 7.25 | 39 | 78 |
| 8.25 | 46 | 92 |
| 9.25 | 50 | 100 |
| 10.00(completion) | 50 | 100 |

% ΔT final − % ΔT initial = 32
% ΔT max. − % ΔT min. = 34

It is evident that in the polymerization as performed in this example the initiator combination provides the shortest reaction time and the most uniform conversion rate. In fact, over the first 72.5 percent of the reaction time there is an absolute ΔT change of only 5°, which makes for an easily and efficiently controlled polymerization with the most efficient overall use of polymerization time.

What is claimed is:

1. Di (3-alkoxy-isobutyryl) peroxides in which each alkoxy group is the same and contains from four to 10 carbon atoms.

2. Di isobutyryl peroxide.

3. Di (3-isobutoxy) isobutyryl peroxide.

* * * * *

UNITED STATES PATENT OFFICE

CERTIFICATE OF CORRECTION

Patent No. 3,728,402 Dated April 17, 1973

Inventor(s) Donald L. Deardorff et al.

It is certified that error appears in the above-identified patent and that said Letters Patent are hereby corrected as shown below:

In the Abstract, and at column 1, line 55, the formula should read:

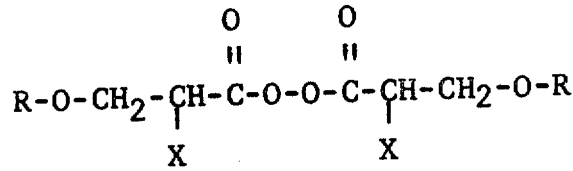

$$R-O-CH_2-\underset{X}{CH}-\overset{O}{\overset{\|}{C}}-O-O-\overset{O}{\overset{\|}{C}}-\underset{X}{CH}-CH_2-O-R$$

Claim 2 should read:

2. Di [3-(2-ethylhexoxy)] isobutyryl peroxide.

Signed and sealed this 12th day of February 1974.

(SEAL)
Attest:

EDWARD M.FLETCHER,JR.
Attesting Officer

C. MARSHALL DANN
Commissioner of Patents